(12) United States Patent
Ramanathan et al.

(10) Patent No.: US 11,430,034 B2
(45) Date of Patent: Aug. 30, 2022

(54) SYSTEM FOR REDUCING COMMUNICATION PAYLOAD ON AN ELECTRONIC COMMERCE NETWORK

(71) Applicant: Dell Products L.P., Round Rock, TX (US)

(72) Inventors: Karthik Ramanathan, Bangalore (IN); Manoj Kumar Venugopal, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 293 days.

(21) Appl. No.: 16/400,580

(22) Filed: May 1, 2019

(65) Prior Publication Data

US 2020/0349624 A1    Nov. 5, 2020

(51) Int. Cl.
*G06Q 30/06* (2012.01)
*G06F 16/23* (2019.01)
*G06Q 10/08* (2012.01)

(52) U.S. Cl.
CPC ......... *G06Q 30/0621* (2013.01); *G06F 16/23* (2019.01); *G06Q 10/087* (2013.01); *G06Q 30/0603* (2013.01)

(58) Field of Classification Search
CPC .................................................. G06Q 30/0621
See application file for complete search history.

(56) References Cited

U.S. PATENT DOCUMENTS

| 10,305,845 | B1* | 5/2019 | Waagen | H04L 67/306 |
| 2007/0162353 | A1* | 7/2007 | Borders | G06Q 10/101 |
| | | | | 705/26.81 |
| 2009/0043673 | A1* | 2/2009 | Caballero | G06Q 40/12 |
| | | | | 705/26.81 |
| 2010/0185522 | A1* | 7/2010 | Ouchi | G06Q 30/06 |
| | | | | 705/28 |
| 2011/0068922 | A1* | 3/2011 | Ross | G06K 17/0029 |
| | | | | 340/572.1 |
| 2012/0259882 | A1* | 10/2012 | Thakur | G06F 16/9535 |
| | | | | 707/E17.074 |
| 2019/0354992 | A1* | 11/2019 | Duckett | G06Q 30/018 |

* cited by examiner

*Primary Examiner* — Van H Oberly
(74) *Attorney, Agent, or Firm* — Terrile, Cannatti & Chambers; Stephen A. Terrile (57) ABSTRACT

A method, system and computer-usable medium are disclosed for reducing communication payload in an e-commerce system. Certain embodiments include a computer-implemented method for storing, at a product host platform, product configuration data including, item identifiers associated with each item of a product configuration, descriptor data respectively associated with each item identifier, and a reductive identifier respectively associated with each item identifier, wherein the reductive identifier associated with each item identifier is generated, at least in part, from the descriptor data of the item identifier. In certain embodiments, the reductive identifiers stored in the product configuration data at the order platform are compared with the reductive identifiers in master product configuration data stored at the product host platform. In certain embodiments, the differences are used as a basis to update the configuration data at the order platform.

21 Claims, 8 Drawing Sheets

SYSTEM FOR REDUCING COMMUNICATION PAYLOAD ON AN ELECTRONIC COMMERCE NETWORK

BACKGROUND OF THE INVENTION

Field of the Invention

The present invention relates to information processing systems used in electronic commerce networks. More specifically, embodiments of the invention relate to a system for reducing communication payload on an electronic commerce network.

Description of the Related Art

As the value and use of information continues to increase, individuals and businesses seek additional ways to process and store information. Accordingly, information processing systems have become ubiquitous to assist users in these tasks. An information processing system generally processes, compiles, stores, and/or communicates information or data for business, personal, or other purposes thereby allowing users to take advantage of the value of the information. Because technology and information processing needs and requirements vary between different users or applications, information processing systems may also vary regarding what information is handled, how the information is handled, how much information is processed, stored, or communicated, and how quickly and efficiently the information may be processed, stored, or communicated. The variations in information processing systems allow for information processing systems to be general or configured for a specific user or specific use such as financial transaction processing, airline reservations, enterprise data storage, or global communications. In addition, information processing systems may include a variety of hardware and software components that may be configured to process, store, and communicate information and may include one or more computer systems, data storage systems, and networking systems.

Such information processing systems may be configured to implement an electronic commerce (e-commerce) platform. An e-commerce platform may be implemented in an information processing system using a comprehensive software tool that allows merchants to build and manage a digital storefront for their products or services. Because e-commerce platforms create a centralized, digital hub for product and customer data, they allow e-commerce businesses to do things like customize product information, manage web content and layout, allow online transactions to occur, and adjust the platform according to businesses' online needs.

SUMMARY OF THE INVENTION

A system of one or more computers can be configured to perform particular operations or actions by virtue of having software, firmware, hardware, or a combination of them installed on the system that in operation causes or cause the system to implement an e-commerce network. One or more computer programs can be configured to perform particular operations or actions by virtue of including instructions that, when executed by data processing apparatus, cause the apparatus to produce communication payload on the e-commerce network. One general aspect includes a computer-implemented method for reducing communication payload in an electronic commerce network, including: storing, at a product host platform, product configuration data including, item identifiers associated with each item of a product configuration, descriptor data respectively associated with each item identifier, and a reductive identifier respectively associated with each item identifier, where the reductive identifier associated with each item identifier is generated, at least in part, from the descriptor data of the item identifier; transmitting the product configuration data from the product host platform to an order platform over a communication network; storing the product configuration data at the order platform; comparing the reductive identifiers stored in the product configuration data at the order platform with the reductive identifiers in the product configuration data stored at the product host platform; and communicating, over the communication network, updated product configuration data to the order platform for an item identifier when the reductive identifier for the item identifier stored at the order platform differs from the reductive identifier stored at the product host platform for the item identifier. Other embodiments of this aspect include corresponding computer systems, apparatus, and computer programs recorded on one or more computer storage devices, each configured to perform the actions of the methods.

One general aspect includes a system including: a processor; a data bus coupled to the processor; and a non-transitory, computer-readable storage medium embodying computer program code, the non-transitory, computer-readable storage medium being coupled to the data bus, the computer program code interacting with a plurality of computer operations and including instructions executable by the processor and configured for: storing, at a product host platform, product configuration data including, item identifiers associated with each item of a product configuration, descriptor data respectively associated with each item identifier, and a reductive identifier respectively associated with each item identifier, where the reductive identifier associated with each item identifier is generated, at least in part, from the descriptor data of the item identifier; transmitting the product configuration data from the product host platform to an order platform over a communication network; storing the product configuration data at the order platform; comparing the reductive identifiers stored in the product configuration data at the order platform with the reductive identifiers in the product configuration data stored at the product host platform; and communicating, over the communication network, updated product configuration data to the order platform for an item identifier when the reductive identifier for the item identifier stored at the order platform differs from the reductive identifier stored at the product host platform for the item identifier. Other embodiments of this aspect include corresponding computer systems, apparatus, and computer programs recorded on one or more computer storage devices, each configured to perform the actions of the methods.

Another general aspect includes a non-transitory, computer-readable storage medium embodying computer program code, the computer program code including computer executable instructions configured for: storing, at a product host platform, product configuration data including, item identifiers associated with each item of a product configuration, descriptor data respectively associated with each item identifier, and a reductive identifier respectively associated with each item identifier, where the reductive identifier associated with each item identifier is generated, at least in part, from the descriptor data of the item identifier; transmitting the product configuration data from the product host platform to an order platform over a communication network; storing the product configuration data at the order platform; comparing the reductive identifiers stored in the product configuration data at the order platform with the reductive identifiers in the product configuration data stored at the product host platform; and communicating, over the communication network, updated product configuration data to the order platform for an item identifier when the reductive identifier for the item identifier stored at the order platform differs from the reductive identifier stored at the product host platform for the item identifier. Other embodiments of this aspect include corresponding computer systems, apparatus, and computer programs recorded on one or more computer storage devices, each configured to perform the actions of the methods.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A system, method, and computer-readable medium are disclosed for reducing communication payload on an e-commerce network. Certain aspects of the invention reflect an appreciation that it is common for many e-commerce businesses to customize the product configurations that the businesses offer to their consumers. As used herein, a product configuration includes, without limitation, a set of items that may be ordered together by a consumer as part of a related transaction.

Certain aspects of the invention recognize that an e-commerce business may provide a storefront, accessible by the consumer, which is implemented as part of an order platform. In certain embodiments, when a consumer accesses the storefront to execute a transaction relating to a product, the consumer is presented with the items and, in certain instances, corresponding subitems (collectively "items") available in the product configuration for the product. In various embodiments, certain items that are available in a product configuration are fixed while other items are selectable by the consumer from the items presented to the consumer at a user interface.

Certain aspects of the invention recognize that multiple order platforms may rely on a centralized product host platform to receive the current product configuration data. As used herein, a product host platform includes any system that defines the primary product configuration data that is to be available to one or more order platforms.

Certain aspects of the invention reflect an appreciation that product configuration data for a product may be voluminous and may change over time. To ensure the order platforms are operating with the latest product configuration data, the product host platform often transmits a complete copy of the updated product configuration data to each of the order platforms. Often, in current systems, this involves sending a complete copy of the product configuration data from the product host platform to the order platforms each time a transaction relating to the product is conducted at the order platform. At that complete copies of the updated configuration data to one or more order platforms, however, may substantially tax network resources leading to a poor user experience at the order platforms, particularly when multiple order platforms concurrently require transmission of the product configuration data from the product host platform.

Certain aspects of the invention recognize that synchronization of the items in a product configuration may be executed using item identifiers and corresponding reductive identifiers for items in the product configuration update operation. In certain embodiments, item identifiers and corresponding reductive identifiers communicated from an order platform are used to identify items of the product configuration that should be updated with the current product configuration data of the product host platform. In certain embodiments, descriptive data for the items of the product configuration data at the order platform need not be communicated to the product host platform thereby reducing the processing overhead associated with communications to the product host platform. In certain instances, the communication payload from the order platform to the product host platform may be reduced by limiting the communication payload to the item identifiers and reductive identifiers for the items currently stored at the order platform for the product configuration to the exclusion of the descriptor data. In certain embodiments, the product host platform may use the item identifiers and reductive identifiers received from the order platform to determine whether updates to the product configuration data at the order platform are needed. If so, certain embodiments communicate updated reduction identifiers and descriptor data for items that have changed. In certain embodiments, the communication payload may be substantially reduced by limiting the transmission of updated configuration data from the product host platform to those items that differ from the items of the product configuration data stored at the order platform.

For purposes of this disclosure, an information processing system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information processing system may be a personal computer, a network storage device, or any other suitable device and may vary in size, shape, performance, functionality, and price. The information processing system may include random access memory (RAM), one or more processing resources such as a central processing unit (CPU) or hardware or software control logic, ROM, and/or other types of nonvolatile memory. Additional components of the information processing system may include one or more disk drives, one or more network ports for communicating with external devices as well as various input and output (I/O) devices, such as a keyboard, a mouse, and a video display. The information processing system may also include one or more buses operable to transmit communications between the various hardware components.

Figure 1:
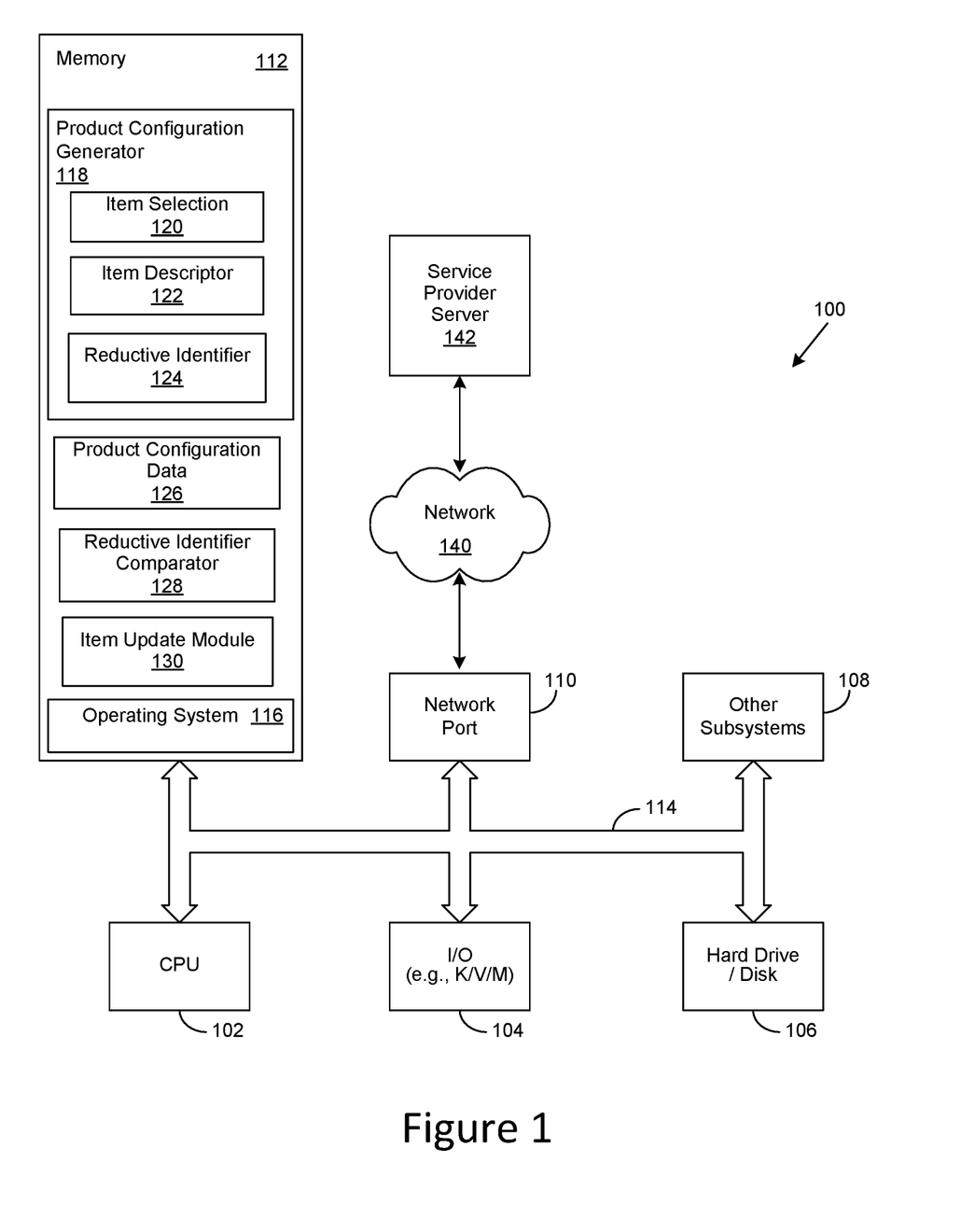
FIG. 1 is a generalized illustration of an information processing system that can be used to implement certain embodiments of the systems and methods of the present invention.

FIG. 1 is a generalized illustration of an information processing system 100 that can be used to implement the systems and methods of the present invention. The information processing system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information processing system 100 also includes network port 110 operable to connect to a network 140, which is likewise accessible by a service provider server 142. The information processing system 100 likewise includes system memory 112, which is interconnected to the foregoing via one or more buses 114. System memory 112 further comprises operating system (OS) 116 and in various embodiments may also comprise a product configuration generator 118. In certain embodiments, the product configuration generator 118 may include an item selection module 120 that may be used to enter and/or select item identifiers that are to be included in a product configuration. In certain embodiments, the product configuration generator 118 may also include an item descriptor module 122, which may be used to assign a description to the item associated with the item identifier. In certain embodiments, the product configuration generator also includes a reductive identifier module 124, which may be used to generate a reductive identifier that is to be associated with the item identifier. In certain embodiments, the reductive identifier may be generated using the description of the item entered at the item descriptor module 122. In certain embodiments, the reductive identifier includes fewer bits of information than the bits of information used in the description of the item. In certain embodiments, the reductive identifier may be used without the corresponding descriptor data of the item to determine which items need to be updated at the order platform with the master product configuration data stored of the product host platform. Since the reductive identifier typically includes fewer bits of information than the description of the item, the payload associated with communications involving identification and updating of changed items may be reduced thereby improving the communication efficiency of the e-commerce platform.

In certain embodiments, the information processing system 100 may be configured as a product host platform. In such instances, the product host platform may include product configuration data 126. In certain embodiments, the product configuration data 126 may be generated by a product provider using, for example, the product configuration generator 118. In certain embodiments, the product configuration data 126 constitutes the master product configuration data that is to be used by all order platforms.

Certain embodiments of the information processing system 100 also include a reductive identifier comparator 128. In certain embodiments, the reductive identifier comparator 128 is configured to compare the reductive identifier for an item identifier received from an order platform with the reductive identifier for the item identifier stored in the master product configuration 126. In certain embodiments, an item update module 130 may be used to transmit updated product configuration data for items having different reductive identifiers as determined by the reductive identifier comparator 128. In certain embodiments, the updated product configuration data may be used to change, supplement, or delete any outdated product configuration data stored at the order platform to thereby ensure that the order platform is operating with the most recent product configuration data.

Figure 2:
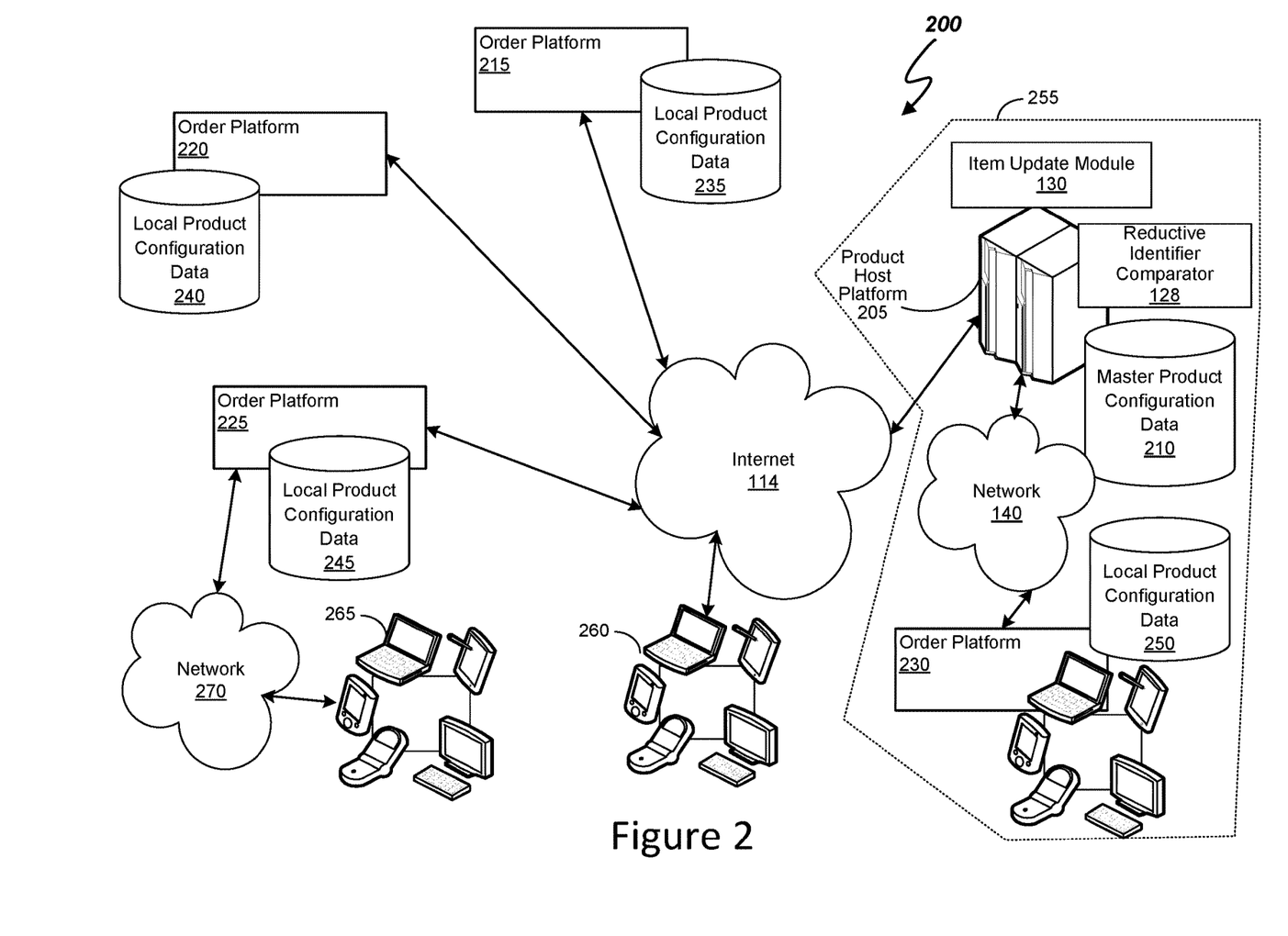
FIG. 2 is a block diagram of an electronic environment in which certain embodiments of the invention may be employed.

FIG. 2 is a block diagram of an electronic environment 200 in which certain embodiments of the invention may be employed. In certain embodiments, the electronic environment 200 may include a product host platform 205 hosting a repository of master product configuration data 210. In certain embodiments the product host platform also includes the reductive identifier comparator 128 and item update module 130. Certain embodiments of the electronic environment 200 also include a plurality of order platforms 215, 220, 225, and 230 configured with respective repositories of local product configuration data 235, 240, 245, and 250.

In certain embodiments, one or more of the order platforms may communicate with the product host platform 205 over a network such as the Internet 114. In the example of FIG. 2, order platforms 215, 220, and 225 are configured for Internet communication with the product host platform 205. In the example of FIG. 2, order platform 230 may communicate with the product host platform 205 over a network 114, such that the order platform 230 forms a front-end system and the product host platform 205 forms the back-end of a product order system 255 of a product provider. In certain embodiments, order platforms 215 and 220 may be configured to communicate with one or more end-user devices 260 over the Internet 114. In certain embodiments, the end-user devices 260 may be used by a consumer to place orders for products through the order platforms 215 and 220. In certain embodiments, one or more end-user devices 265 may be used to interact with order platform 225 over, for example, an enterprise network 270 to place product orders.

When a consumer configures a product for purchase, lease, etc., the consumer should be presented with the most recent product configuration available for the product at the order platform. Accordingly, the local product configuration data 235, 240, 245, and 250 should be synchronized with the repository of master product configuration data 210 at the product host platform 205. As noted herein, the product configuration data at the repository of master product configuration data 210 may be voluminous. Accordingly, synchronization of the product configuration data may require communication of a substantial amount of information over, for example, the Internet 114 or other type of network. In existing systems, such synchronization takes place through transmission and/or retransmission of a complete copy of the product configuration data each time that a consumer configures a product order at one of the order platforms. Such transmission and/or retransmission of complete copies of the product configuration data may unduly tax the processing resources and lead to poor performance of the e-commerce system. The disclosed systems and methods may be used to reduce the payload of such communications and thereby improve the performance of the e-commerce system.

Figure 3:
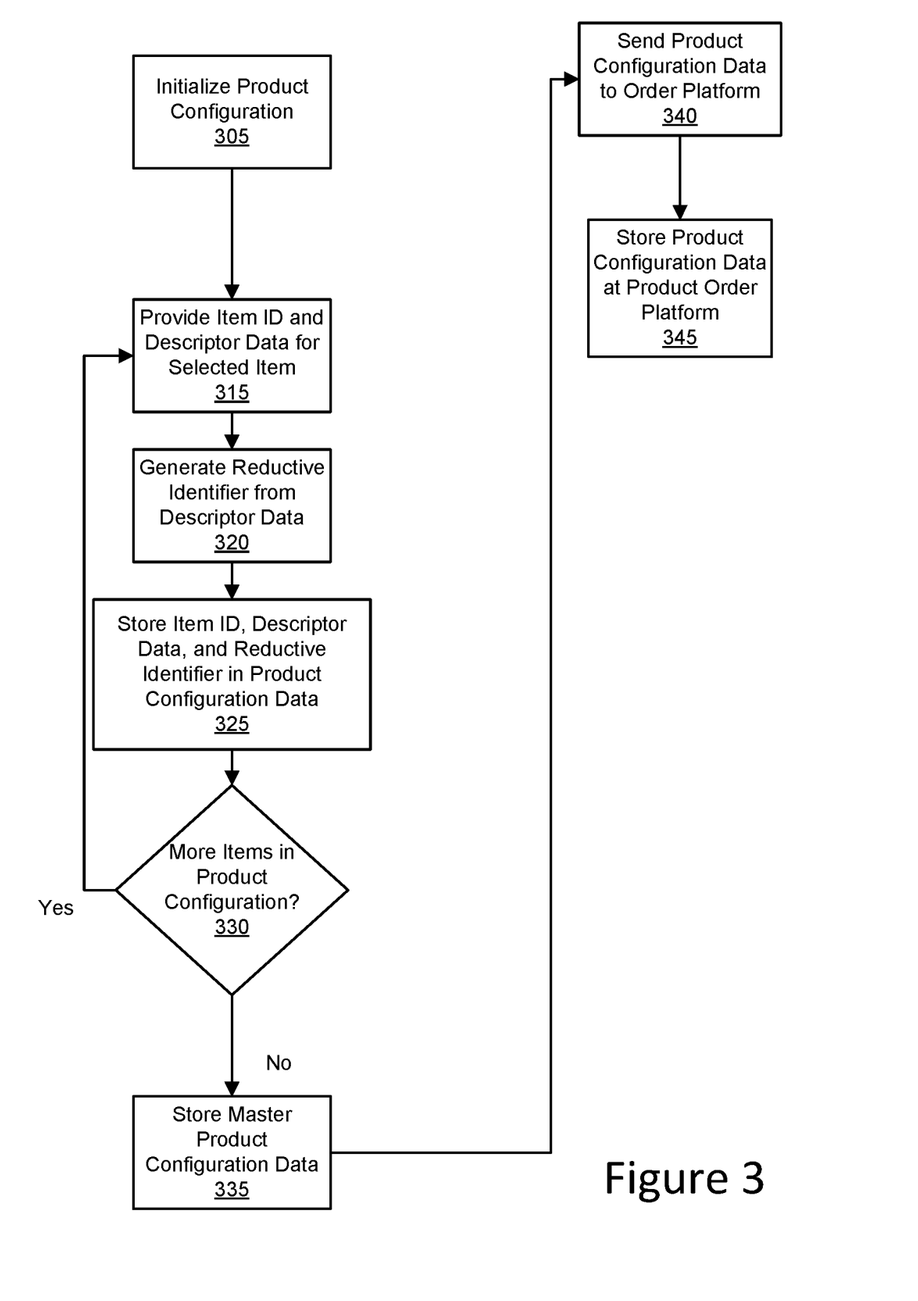
FIG. 3 depicts a flowchart of exemplary operations that may be used to generate a product configuration for a product and initially store that product configuration at an order platform.

FIG. 3 depicts a flowchart of exemplary operations that may be used to generate a product configuration for a product and initially store that product configuration at an order platform. In certain embodiments, the product configuration is initialized at operation 305 by identifying the product that is to be associated with the product configuration data. In certain embodiments, a user enters an item ID and descriptor data for an item that is to be included in the product configuration at operation 315. In certain embodiments, the descriptor data may include data describing the item, which may be presented in human readable text to a consumer at the order platform. Additionally, or on the alternative, the descriptor data in certain embodiments may include pricing information, inventory information (e.g. availability), etc.

In certain embodiments, a reductive identifier for the item is generated at operation 320. In certain embodiments, the reductive identifier is generated from the descriptor data provided at operation 315. In certain embodiments, the reductive identifier is generated using all of the data in the descriptor data, while other embodiments may generate the reductive identifier from a subset of the descriptor data. In certain embodiments, the reductive identifier may be generated as a hash value from the descriptor data. Additionally, or on the alternative, the reductive identifier may be generated as a checksum of the descriptor data. In most embodiments, the reductive identifier generated from the descriptor data will have fewer bits than the number of bits of the descriptor data itself. In certain embodiments, the reductive identifier may be viewed as a reduction of the descriptor data and used to limit the payload in communications between the order platforms and the product host platform as described herein.

As shown at operation 325, certain embodiments store the item identifier, descriptor data, and reductive identifier for the item in the product configuration data. In certain embodiments, a determination is made at operation 330 as to whether more items are to be included in the product configuration data. If so, the system repeats operations 315, 320, and 325 until the product configuration is completed. In certain embodiments, the product configuration data generated at operations 315, 320, and 325 are stored as the master product configuration data at operation 335. In certain embodiments, the master product configuration data is stored in a repository of master product configuration data of the product host system.

Once the master product configuration data has been generated, it may be transmitted to each of the order platforms. In certain embodiments, the product configuration data is sent to the order platforms at operation 340. At operation 345, certain embodiments store the product configuration data received from the product host platform at the order platform. Once the product configuration data is stored at the order platform, the data at the order platform may be used as a base line from which needed updates are identified by the product host platform and transmitted to the order platform, as described herein.

Figure 4:
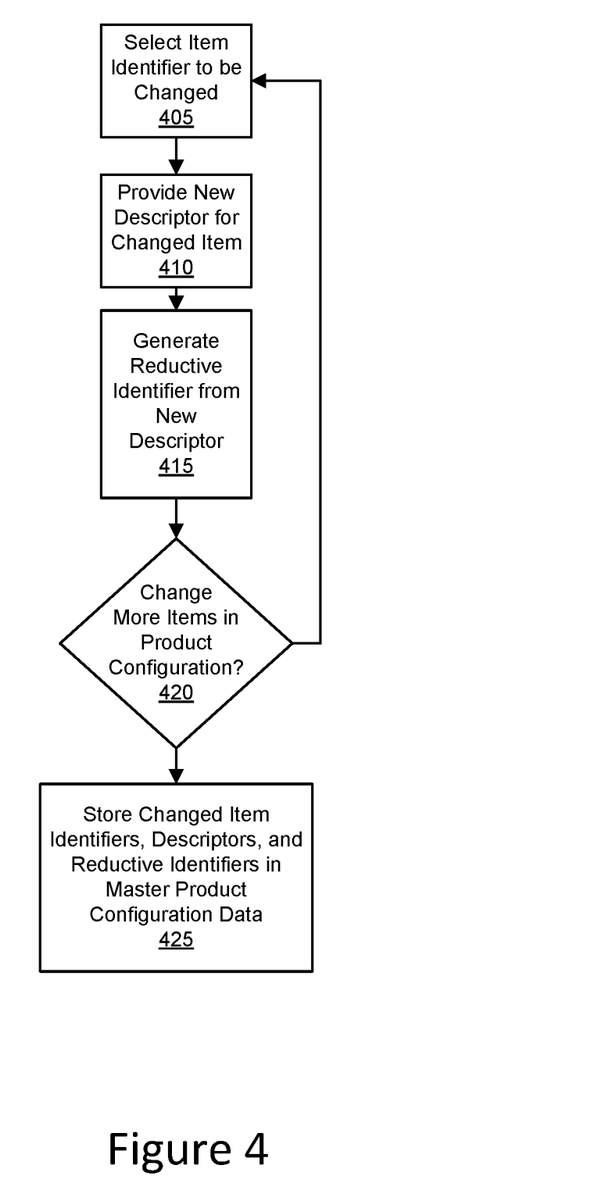
FIG. 4 is a flowchart depicting exemplary operations that may be used to make changes to the master configuration data of the product host platform.

FIG. 4 is a flowchart depicting exemplary operations that may be used to make changes to the master configuration data at the product host platform. In this example, the item identifier associated with the item that is to be changed is selected at operation 405. In certain embodiments, a new descriptor for the changed item is provided at operation 410, and used to generate a new reductive identifier for the item identifier at operation 415. At operation 420, certain embodiments may check to determine whether more items in the product configuration are to be changed and, if so, repeat operations 405, 410, and 415 until all changes have been completed. In certain embodiments, the changes to the product configuration are stored in, for example, the repository of master product configuration data at the product host platform. In certain embodiments, only the portions of the master product configuration data that have been changed are updated in the repository. In certain embodiments, the master product configuration data may be completely overwritten by combining the existing product configuration data and the updated product configuration data as a single data set and storing that data set as the master product configuration data. It will be recognized, in view of the teachings of the present disclosure, however, that there are a variety of different manners that may be used to update the master product configuration data with the data for the changed items, the foregoing describing merely one example.

Figure 5:
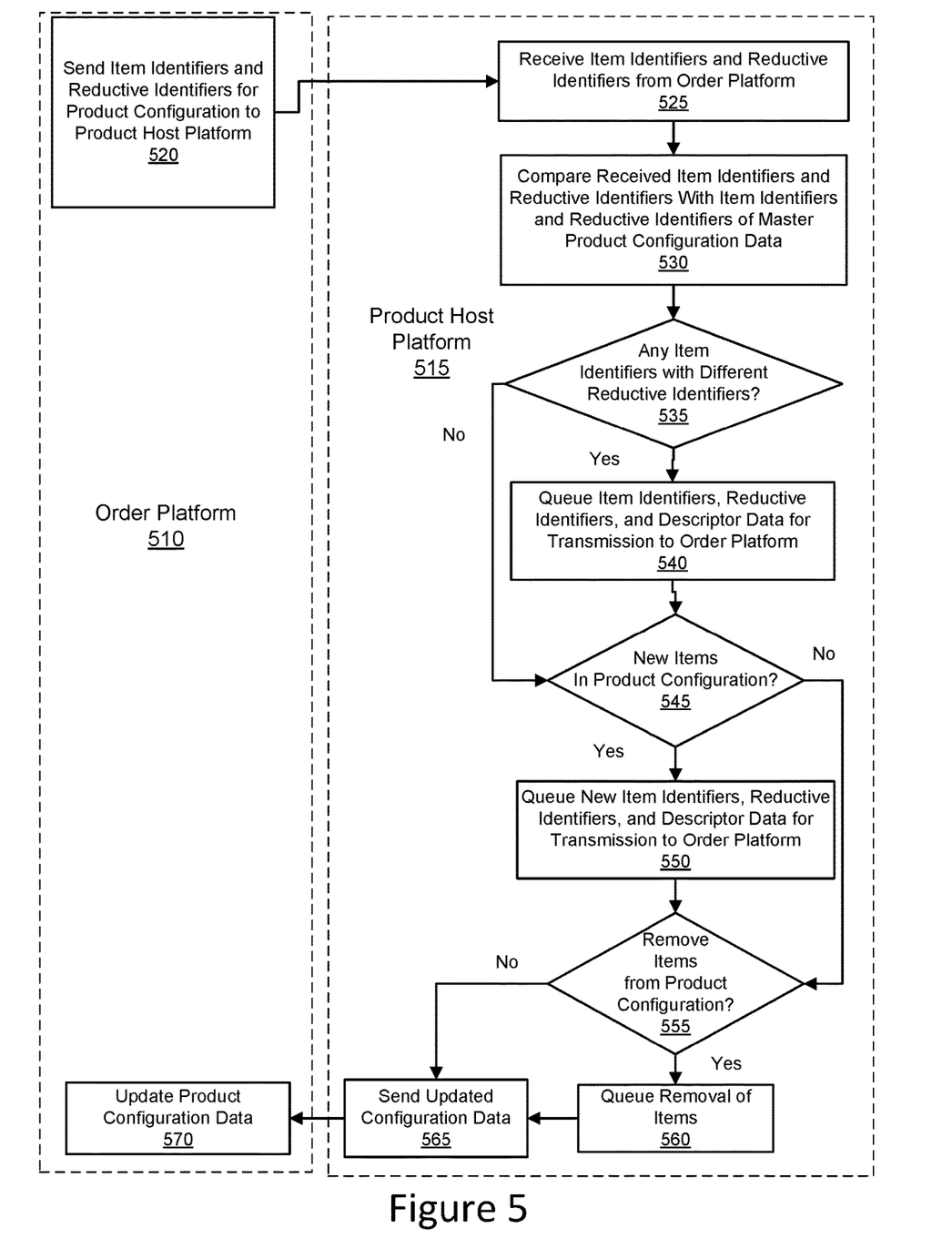
FIG. 5 is a flowchart depicting exemplary operations that may be executed at an order platform and a product host platform in accordance with certain embodiments.

FIG. 5 is a flowchart depicting exemplary operations that may be executed at an order platform 510 and a product host platform 515 in accordance with certain embodiments. In certain embodiments, the depicted operations may be executed in response to a triggering event. In certain embodiments, the triggering event occurs in response to a transaction involving the product configuration data stored at the order platform. As an example, the depicted operations may be initiated when a consumer at the order platform 510 begins executing a transaction (e.g., purchase, lease, etc.) relating to the product. As another example, the depicted operations may be executed when the order platform 510 and/or host product platform 515 initiate a request for an update of the product configuration.

In certain embodiments, the order platform 510 sends item identifiers and reductive identifiers for the product configuration to the product host platform at operation 520. In certain embodiments, the item identifiers and reductive identifiers are those stored for the product configuration at the order platform 510. In certain embodiments, all of the item identifiers and reductive identifiers for the product configuration are sent without corresponding descriptor data. As such, the payload of the product configuration communication is limited compared to the payload of a transmission of the complete product configuration with the corresponding descriptor data.

Certain embodiments of the product host platform 515 receive the item identifiers and reductive identifiers from the order platform 510 at operation 525. At operation 530, certain embodiments compare the item identifiers and reductive identifiers received from the order platform 510 to the item identifiers and reductive identifiers of the master product configuration data of the product host platform 515. Certain embodiments check at operation 535 whether any of the identifiers received from the order platform 510 have reductive identifiers that are different from those of the master product configuration data. In certain embodiments, the item identifiers, reductive identifiers, and descriptor data of the items of the master product configuration data that differ from the items of the product configuration data received from the order platform, as determined by the comparison at operation 535, are queued for transmission to the order platform at operation 540.

At operation 545, certain embodiments make a determination as to whether there are new items in the product configuration that need to be sent to the order platform 510. As an example, the item identifiers received from the order platform 510 may be compared to the item identifiers received from the order platform to determine whether the product configuration data at the order platform includes all items in the master product configuration data. At operation 550, any new items in the product configuration data may be queued for transmission to the order platform 510. In certain embodiments, the queued data includes the new item identifier, reductive identifier, and descriptor data for the new item.

In certain instances, a comparison between the master product configuration data and the product configuration data received from the order platform 510 may indicate that an item is to be removed from the product configuration data. To this end, certain embodiments may make this determination at operation 555 by comparing the received item identifiers with the item identifiers of the master product configuration data to determine whether any of the received item identifiers are no longer present in the master product configuration data. Any items that are to be removed from the product configuration data at the order platform may be queued for removal at operation 560. In certain embodiments, the product host platform may send a special agreed upon identifier to the order platform that indicates that a particular reductive data identifier is to be removed from the product configuration data at the order platform.

In certain embodiments, the queued configuration data is sent to the order platform at operation 565. In certain embodiments, the queues generated at operations 540, 550, and 560 may be sent to the order platform 510 as the queues are generated at the product host platform 515. In certain embodiments, all of the queues may be sent as a group at operation 565. In certain embodiments, the order platform 510 updates the product configuration data at the order platform 510 at operation 570 so that the order platform 510 is operating with the most recent version of the product configuration data. In certain embodiments, only the product configuration data that needs updating is sent to the order platform 510, as opposed to transmission of a complete copy of the master product configuration data. In certain embodiments, the payload of the transmissions from the product host platform 515 to the order platform 510 associated with configuration updates may be reduced in this manner.

Figure 6:
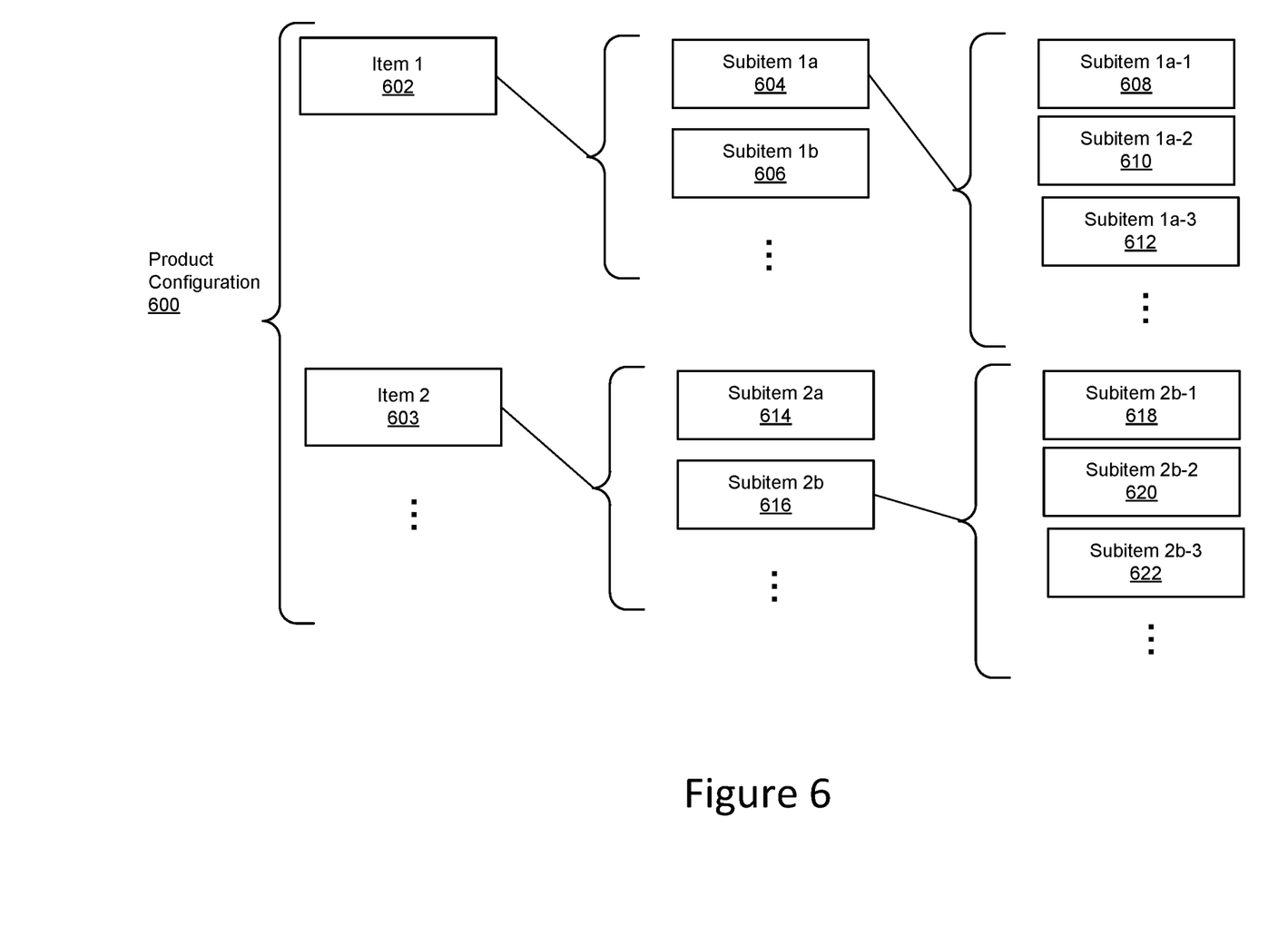
FIG. 6 is a hierarchical diagram depicting one example of a product configuration that may be employed in certain embodiments.

FIG. 6 is a hierarchical diagram depicting one example of a product configuration 600 that may be employed in certain embodiments. In certain embodiments, the product configuration 600 may include a plurality of items 602, 603, etc. In the illustrated example, item 602 may include one or more subitems 604, 606, etc., and item 603 includes subitems 614, 616, etc. Also, in certain embodiments, one or more of the subitems may include a further subset of subitems. In this example, subitem 604 includes a subset of subitems 608, 610, 612, etc., and subitems 616 includes a further subset of subitems 618, 620, 622, etc. Although the foregoing example makes use of the terms items, subitems, and subsets of subitems, it will be recognized, in view of the present disclosure, that these terms may be used interchangeably in certain embodiments.

The hierarchy of the product configuration 600 may be understood with reference to an example involving the product configuration for an information processing system. For example, items 602 and 603 may be directed to different processors available from different manufacturers that may be selected by a consumer to configure their information processing system. As an extension of this example, item 602 may be a processor made by Intel®, while item 603 may be a processor made by AMD®. To further extend this example, subitems 604 and 606 may correspond to the number of cores available in the Intel® processor. To further extend this example, the subset of subitems 608, 610, and 612 may correspond to the available cache sizes for a selected processor having a selected number of cores. It will be understood, in view of the teachings of the present disclosure, that the product configuration 600 may be arranged in any manner to include any items that are to be made available to the consumer as the consumer configures the product at the order platform.

Figure 7:
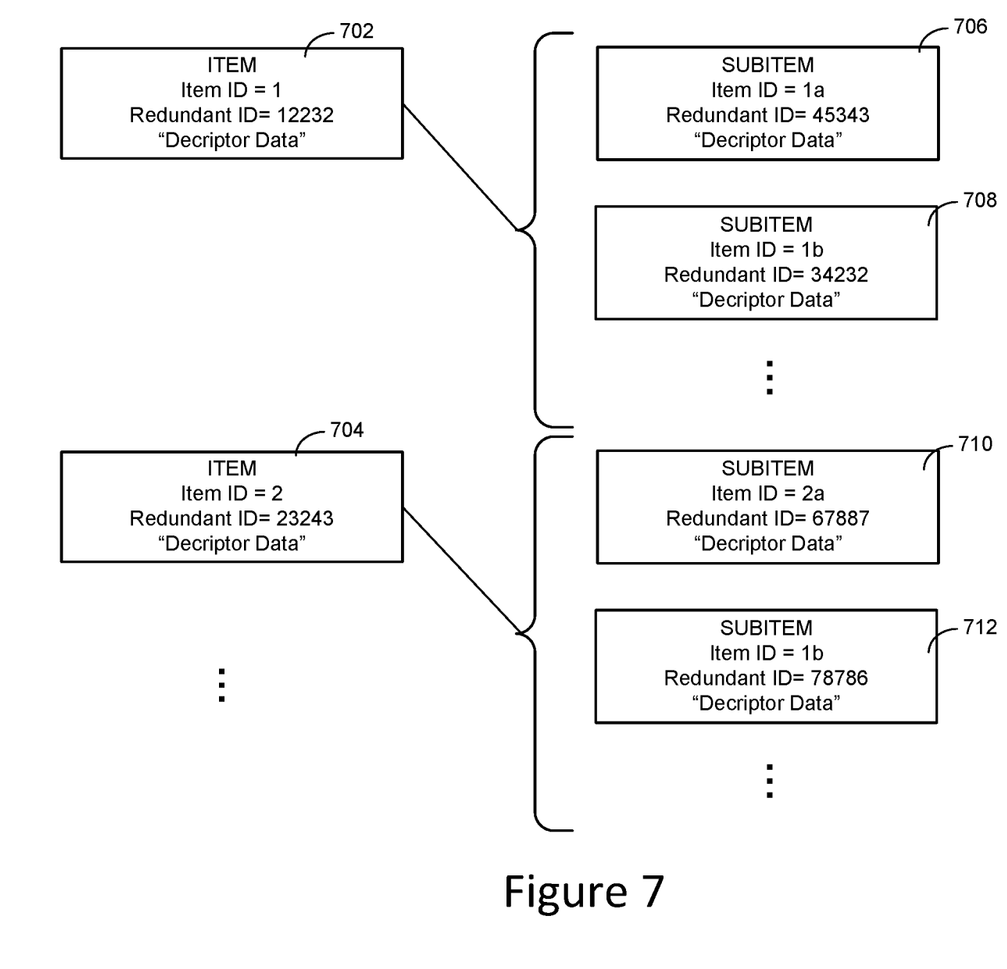
FIG. 7 depicts exemplary information that may be found in product configuration data in certain embodiments.

FIG. 7 depicts exemplary information that may be found in product configuration data in certain embodiments. In this example, item 702 has an Item ID=1, a Redundant ID=12232, and <Descriptor Data> for the item. Item 704 has an Item ID=2, a Redundant ID=23243, and <Descriptor Data> for the item. Item 702 includes two subitems 706 and 708. Subitem 706 has an Item ID=1a, a Redundant ID=45343, and <Descriptor Data> for the subitem. Subitem 708 has an Item ID=1b, a Redundant ID=45343, and <Descriptor Data> for the subitem.

As also shown in this example, item 704 also includes two subitems. In this example, subitem 710 has an Item ID=2a, a Redundant ID=67887, and <Descriptor Data> for the subitem. Subitem 712 has an Item ID=2b, a Redundant ID=78786, and <Descriptor Data> for the subitem.

Figure 8:
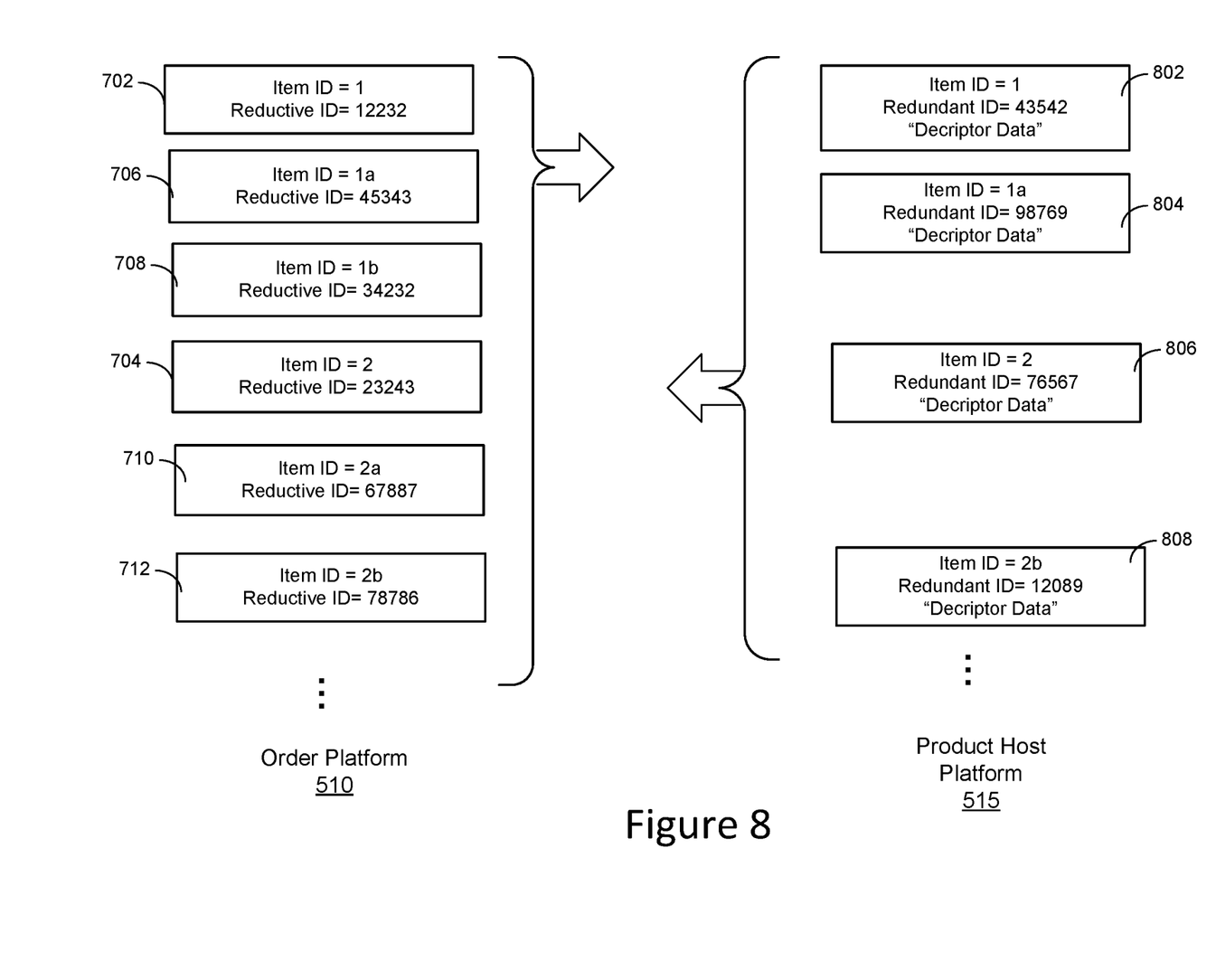
FIG. 8 depicts exemplary information that may be exchanged between the order platform and product host platform using the data shown in FIG. 7.

FIG. 8 depicts exemplary information that may be exchanged between the order platform 510 and product host platform 515 using the exemplary data shown in FIG. 7. In this example, the order platform 510 transmits, to the product host platform 515, the item ID and reductive ID for each item in a product configuration that the order platform has stored for the product configuration. In this example, the product host platform 515 compares the redundant ID for each item ID that is sent by the order platform 510 with the redundant ID for each item that is stored in the master product configuration data. In this example, all of the item IDs and redundant IDs stored at the order platform are sent to the product host platform 515.

In this example, the product host platform 515 has compared the item ID and reductive ID for each item of the product configuration sent from the order platform 510 with the item ID and reductive ID for each item of the master product configuration at the product host platform 515. As a result of this comparison, the product host platform 515 has determined in this example that item 802 (Item ID=1), item 804 (Item ID=1a), item 806 (Item ID=2), and item 808 (Item ID=2b) require updating at the order platform 510. Accordingly, the product host platform 515 transmits the Item ID, Redundant ID, and descriptor data for each of items 802, 804, 806, and 808 to the order platform 510. In certain embodiments, the product host platform 515 sends only the Item IDs, Redundant IDs, and descriptor data for changed items to reduce the overall payload of transmissions to the order platform 510 when compared to transmission of a complete copy of the master product configuration data to the order platform 510. It will be recognized, in view of the present disclosure, that the foregoing exchange is merely exemplary and not meant to limit the scope of the present invention.

As will be appreciated by one skilled in the art, the present invention may be embodied as a method, system, or computer program product. Accordingly, embodiments of the invention may be implemented in hardware, in software (including firmware, resident software, micro-code, etc.) or in an embodiment combining software and hardware. Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implemented method for reducing communication payload in an electronic commerce network, comprising:
   storing, at a product host platform, product configuration data including, item identifiers associated with each item of a product configuration, descriptor data respectively associated with each item identifier, and
   a reductive identifier respectively associated with each item identifier, wherein the reductive identifier associated with each item identifier is generated, at least in part, from the descriptor data of the item identifier, the reductive identifier including fewer bits of information than bits of information contained within the descriptor data, the reductive identifier being a reduction of the descriptor data so as to reduce the communication payload;
   transmitting the product configuration data from the product host platform to an order platform over a communication network;
   storing the product configuration data at the order platform;
   comparing the reductive identifiers stored in the product configuration data at the order platform with the reductive identifiers in the product configuration data stored at the product host platform; and
   communicating, over the communication network, updated product configuration data to the order platform for an item identifier when the reductive identifier for the item identifier stored at the order platform differs from the reductive identifier stored at the product host platform for the item identifier.

2. The computer-implemented method of claim 1, wherein
   transmitting, in response to a triggering event, product configuration data stored at the order platform to the product host platform over the communication network for comparison with the product configuration data stored at the product host platform, wherein the product configuration data transmitted by the order platform has a payload that principally includes the item identifiers and reductive identifiers for the product configuration.

3. The computer-implemented method of claim 2, wherein
   the updated product configuration data communicated to the order platform for item identifier is substantially limited to having different corresponding reductive identifiers.

4. The computer-implemented method of claim 1, further comprising:
   comparing the item identifiers stored at the order platform with the item identifiers stored at the product host platform; and
   in response to the comparison, executing at least one operation selected from a group of operations comprising
   adding an item identifier, descriptor data, and reductive identifier to the product configuration data at the order platform when the item identifier exists in the product configuration data at the product host platform, but not in the product configuration data at the order platform; and removing an item identifier, descriptor data, and reductive identifier from the product configuration data at the order platform when the item identifier exists in the product configuration data at the order platform, but not in the product configuration data at the product host platform.

5. The computer-implemented method of claim 1, wherein the reductive identifier associated with each item identifier is generated as one or more of:

a hash value of the descriptor data of the item identifier; and a checksum value of the descriptor data of the item identifier.

6. The computer-implemented method of claim 1, further comprising:

transmitting the item identifier and reductive identifier for each item in a product configuration from the order platform to the product host platform over the communication network in response to a triggering event;

comparing the item identifier and reductive identifier for each item in the product configuration received over the communication network from the order platform with the item identifiers and reductive identifiers in the product configuration data stored at the product host platform; and communicating, over the communication network, updated product configuration data to the order platform for an item identifier when the reductive identifier for the item identifier received from the order platform differs from the reductive identifier stored at the product host platform for the item identifier.

7. The computer-implemented method of claim 6, wherein the item identifier and reductive identifier for each item in a product configuration are transmitted from the order platform to the host product platform in response to one or more of:

a transaction relating to the product configuration occurring at the order platform; and an update request received by the order platform from the product host platform.

8. The computer-implemented method of claim 1, wherein the product configuration includes a plurality of items where at least one of the plurality of items includes an associated subitems; and, the product configuration data includes information regarding the plurality of items and the associated subitem, the information regarding the plurality of items and the associated subitem include respective reductive identifiers.

9. A system comprising:

a processor;

a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for:

storing, at a product host platform, product configuration data including, item identifiers associated with each item of a product configuration, descriptor data respectively associated with each item identifier, and a reductive identifier respectively associated with each item identifier, wherein the reductive identifier associated with each item identifier is generated, at least in part, from the descriptor data of the item identifier, the reductive identifier including fewer bits of information than bits of information contained within the descriptor data, the reductive identifier being a reduction of the descriptor data so as to reduce the communication payload;

transmitting the product configuration data from the product host platform to an order platform over a communication network;

storing the product configuration data at the order platform;

comparing the reductive identifiers stored in the product configuration data at the order platform with the reductive identifiers in the product configuration data stored at the product host platform; and communicating, over the communication network, updated product configuration data to the order platform for an item identifier when the reductive identifier for the item identifier stored at the order platform differs from the reductive identifier stored at the product host platform for the item identifier.

10. The system of claim 9, wherein transmitting, in response to a triggering event, product configuration data stored at the order platform to the product host platform over the communication network for comparison with the product configuration data stored at the product host platform, wherein the product configuration data transmitted by the order platform has a payload that principally includes the item identifiers and reductive identifiers for the product configuration.

11. The system of claim 10, wherein the updated product configuration data communicated to the order platform for item identifier is substantially limited to having different corresponding reductive identifiers.

12. The system of claim 9, further comprising:

comparing the item identifiers stored at the order platform with the item identifiers stored at the product host platform; and in response to the comparison, executing at least one operation selected from a group of operations comprising adding an item identifier, descriptor data, and reductive identifier to the product configuration data at the order platform when the item identifier exists in the product configuration data at the product host platform, but not in the product configuration data at the order platform; and removing an item identifier, descriptor data, and reductive identifier from the product configuration data at the order platform when the item identifier exists in the product configuration data at the order platform, but not in the product configuration data at the product host platform.

13. The system of claim 9, wherein the reductive identifier associated with each item identifier is generated as one or more of:

a hash value of the descriptor data of the item identifier; and a checksum value of the descriptor data of the item identifier.

14. The system of claim 9, further comprising:

transmitting the item identifier and reductive identifier for each item in a product configuration from the order platform to the product host platform over the communication network in response to a triggering event;

comparing the item identifier and reductive identifier for each item in the product configuration received over the communication network from the order platform with the item identifiers and reductive identifiers in the product configuration data stored at the product host platform; and communicating, over the communication network, updated product configuration data to the order platform for an item identifier when the reductive identifier for the item identifier received from the order platform differs from the reductive identifier stored at the product host platform for the item identifier.

15. The system of claim 14, wherein the item identifier and reductive identifier for each item in a product configuration are transmitted from the order platform to the host product platform in response to one or more of:

a transaction relating to the product configuration occurring at the order platform; and an update request received by the order platform from the product host platform.

16. A non-transitory, computer-readable storage medium embodying computer program code, the computer program code comprising computer executable instructions configured for:

storing, at a product host platform, product configuration data including, item identifiers associated with each item of a product configuration, descriptor data respectively associated with each item identifier, and a reductive identifier respectively associated with each item identifier, wherein the reductive identifier associated with each item identifier is generated, at least in part, from the descriptor data of the item identifier, the reductive identifier including fewer bits of information than bits of information contained within the descriptor data, the reductive identifier being a reduction of the descriptor data so as to reduce the communication payload;

transmitting the product configuration data from the product host platform to an order platform over a communication network;

storing the product configuration data at the order platform;

comparing the reductive identifiers stored in the product configuration data at the order platform with the reductive identifiers in the product configuration data stored at the product host platform; and communicating, over the communication network, updated product configuration data to the order platform for an item identifier when the reductive identifier for the item identifier stored at the order platform differs from the reductive identifier stored at the product host platform for the item identifier.

17. The non-transitory, computer-readable storage medium of claim 16, wherein transmitting, in response to a triggering event, product configuration data stored at the order platform to the product host platform over the communication network for comparison with the product configuration data stored at the product host platform, wherein the product configuration data transmitted by the order platform has a payload that principally includes the item identifiers and reductive identifiers for the product configuration.

18. The non-transitory, computer-readable storage medium of claim 17, wherein the updated product configuration data communicated to the order platform for item identifier is substantially limited to having different corresponding reductive identifiers.

19. The non-transitory, computer-readable storage medium of claim 16, further comprising:

comparing the item identifiers stored at the order platform with the item identifiers stored at the product host platform; and in response to the comparison, executing at least one operation selected from a group of operations comprising adding an item identifier, descriptor data, and reductive identifier to the product configuration data at the order platform when the item identifier exists in the product configuration data at the product host platform, but not in the product configuration data at the order platform; and removing an item identifier, descriptor data, and reductive identifier from the product configuration data at the order platform when the item identifier exists in the product configuration data at the order platform, but not in the product configuration data at the product host platform.

20. The non-transitory, computer-readable storage medium of claim 16, wherein the reductive identifier associated with each item identifier is generated as one or more of:

a hash value of the descriptor data of the item identifier; and a checksum value of the descriptor data of the item identifier.

21. The non-transitory, computer-readable storage medium of claim 16, further comprising:

transmitting the item identifier and reductive identifier for each item in a product configuration from the order platform to the product host platform over the communication network in response to a triggering event;

comparing the item identifier and reductive identifier for each item in the product configuration received over the communication network from the order platform with the item identifiers and reductive identifiers in the product configuration data stored at the product host platform; and communicating, over the communication network, updated product configuration data to the order platform for an item identifier when the reductive identifier for the item identifier received from the order platform differs from the reductive identifier stored at the product host platform for the item identifier.

* * * * *